UNITED STATES PATENT OFFICE.

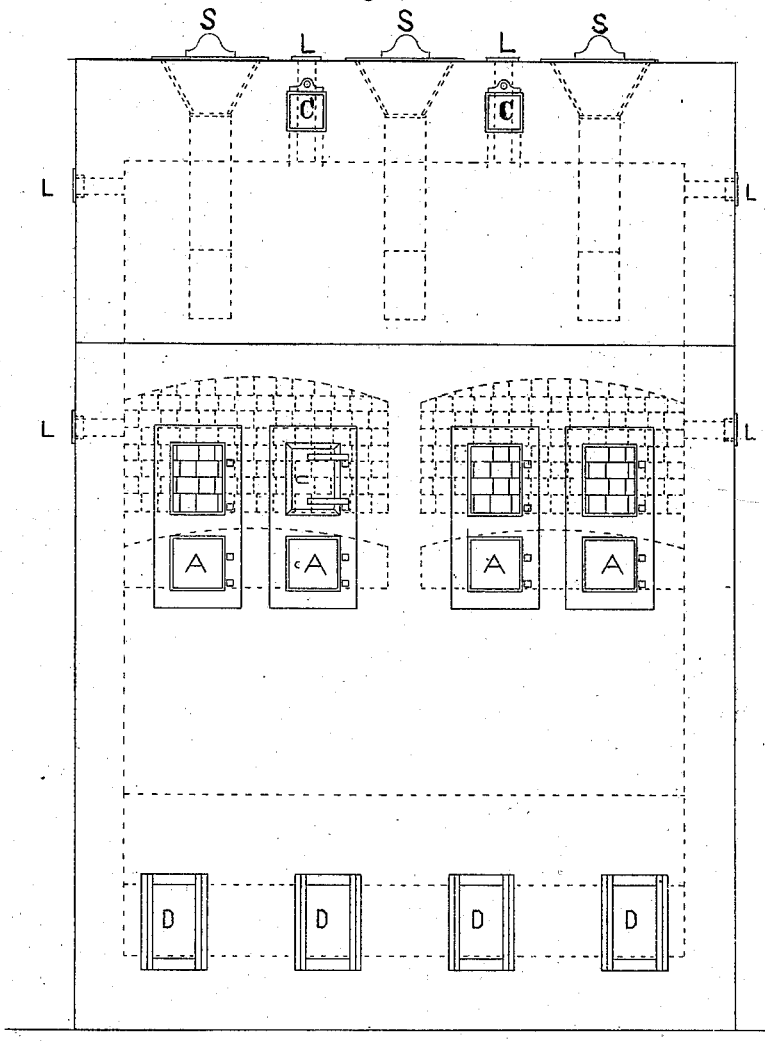

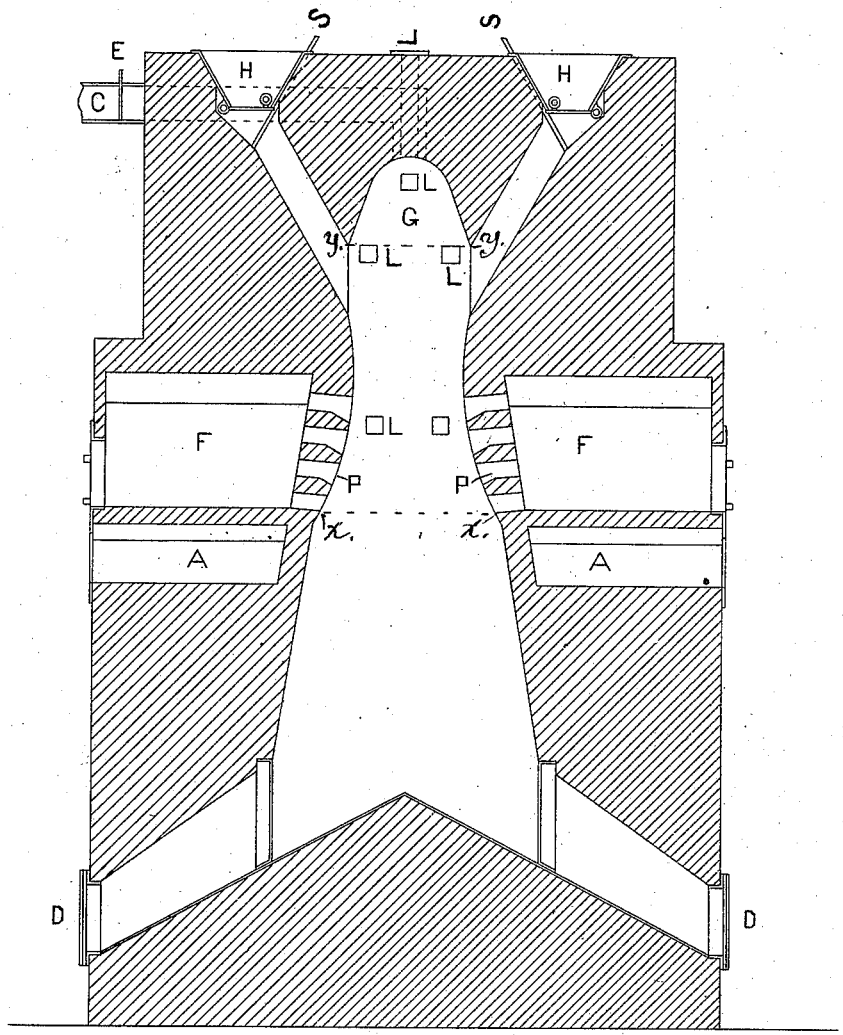

EDMUND GREEN AND ABRAHAM HALSEY, OF SAN FRANCISCO, CAL.

IMPROVEMENT IN SHAFT-FURNACES FOR ROASTING ORES.

Specification forming part of Letters Patent No. 194,772, dated September 4, 1877; application filed June 20, 1877.

*To all whom it may concern:*

Be it known that we, EDMUND GREEN and ABRAHAM HALSEY, residing, respectively, in Oakland and San Francisco, State of California, and doing business at No. 312 Montgomery street, in said city of San Francisco, have invented a new and useful Continuous Roasting and Calcining Shaft-Furnace for the reduction, roasting, and calcining of all kinds of ores, limestone, rock, or earth containing valuable products, metals, or minerals, and especially adapted to the reduction or calcining of ores or rocks containing poisonous or injurious substances, and which, in their reduction, emit fumes or vapors dangerous to public health, and also all ores whose valuable parts are required to be saved by means of condensation or precipitation after said ores shall have been roasted or calcined, such as cinnabar, zinc, or arsenical ores; and we do hereby declare that the following is a full, clear, and exact description of the construction and operation of the same, reference being had to the accompanying drawings, making a part of this specification, in which—

Figure 1 is a side or fire-front view, (the opposite side being the same,) in which D are the draw or discharge doors; A, the ash-pits beneath the fire-doors. L L are peep-holes, (with iron plugs,) through which the condition of the ores and operation of the furnace may be observed from various points on all sides and from the top of the furnace. These peep-holes are placed chiefly opposite where the fire enters the furnace, and at top of the ore-line, where the furnace is charged, such line being the bottom of the gas-chamber; and they are also placed on top of the furnace, and through any of such holes bars may be inserted to stir the ores being roasted, to open draft places in it, and also to break any clinkers that may form in the furnace while ores are being roasted, &c. S is a slide or gate in hopper, through which the furnace is fed and by which the amount of the charge may be regulated, as well as any particular portion of the furnace charged with ore. C are the flues through which the products of roasting the ore and vapors or gases are conducted to condensers, or by which dangerous vapors are conducted to a safe distance for discharge, &c.

Fig. 2 is a cross-section of the furnace, showing its particular form on the inside, as well as general outline on the outside, being an end view of the furnace. In this Fig. 2, D D represent the draw or discharge doors, working in a slide, (which are raised or lowered by means of levers or chains,) discharging on either side from the bottom of inclined planes, and at sufficient elevation to allow a car to be run alongside and underneath, to carry away the débris or calcined material from the furnace.

A A represent the ash-pits beneath the fireplaces F F, and, instead of iron grate-bars, arched fire-brick are used for the bottom of the fire-place, with sufficient space between the arches to allow for draft and for discharge of ashes into the ash-pits. P P are the pigeonholes through which the fire passes into the furnace and through the ore, ascending to the gas-chamber G, carrying all products of combustion with it, and all escaping out of the flues C into condensing-chambers or other receptacles. H H represent the hoppers through which the furnace is charged, and which may have doors or gates in the bottom, as represented in Fig. 2, but we prefer the slides S S, as above described. E is a gate or damper in the flues C C, by which any one flue or escapepipe may be closed for repairs or for occasional cleaning of deposit therein.

Our furnace is a continuous-working one. We charge it through two or more hoppers, according to the size of the furnace and the quantity of ore or other material to be reduced, these hoppers being placed on top of the furnace and on both sides of the gaschamber. The discharge-outlets are also placed on both sides of the furnace, and fires are built at the front and back of the furnace, and large furnaces and even the smaller ones may be so constructed as to have fires at the sides or ends, just over the discharge-doors.

The operation of this furnace may be described thus: After erection and completion the furnace is filled with any waste rock or material to about the level of the lower pigeonholes, as shown in dotted lines $x$ $x$ in Fig. 2, and then charged with the ore or rock desired to be calcined to a point above the top of the upper pigeon-holes P. When the fires are applied, and as soon thereafter as practicable, and a proper degree of heat is attained, the furnace is fully charged to bottom of the gas-chamber, as indicated by the dotted lines $y\ y$ in Fig. 2, the hoppers also being always kept full of ore.

When fully charged and fully heated to the bottom of the gas-chamber the furnace may be said to be fairly in operation, and alternate drawing off and charging may be commenced and continued. Soon all the waste material with which the space below the fires was first charged will be drawn out of the furnace, and the hot rock will descend into its place, gradually cooling off as it is drawn down toward the bottom, until finally it can be handled by workmen without danger or inconvenience, and the heat it contained will all have ascended and been utilized in assisting the fires to heat and roast the fresh charges of ore. The ore-chamber enlarges as the ore descends toward the bottom, thus permitting free discharge and descent of the ore after it is burned, this enlargement commencing at about the top line of the upper pigeon-holes P, and continuing to the bottom of the ore-chamber, as shown in the drawings; but that portion of the enlargement which is below the line of the fire-places is a gradually-increasing one, its opposite walls diverging so as to offer no obstacle to the ready descent of the ore, &c.

From the fire-place up, the furnace is curved inwardly, causing the flames to enter the ore more readily and from either side, to permeate the whole mass above the pigeon-holes. The gas-chamber being on top, and the exit-flues also, the draft of the furnace and course of the flames are toward the center of the furnace, ascending through the descending ore.

The ore in the hoppers beneath the slides becomes heated to a considerable degree, and is thus prepared for an easier reduction when drawn down into the furnace.

The location of the fire-doors in front of the pigeon-holes enables the workmen to see the condition of the ore directly in front of his fires, and to insert an iron bar to open the draft of any pigeon-hole that may be clogged by clinker or otherwise; and, the lower sides of the interior ends of the pigeon-holes being beveled off downward, the descending ore will not lodge therein. Through peep-holes, on top especially, bars may be inserted to break up clinkers and hasten the descent of the ore in case of lodgment or otherwise.

The draw-doors being so numerous, and upon either side, allow ore or débris to be drawn from either corner, middle, or any part of the furnace. The hoppers being also numerous, and similarly situated with reference to the top of the furnace as the draw-doors are with reference to the bottom, permit the furnace to be charged likewise at any desired point.

For roasting lime this furnace would be a continuous limekiln, and the draft thoroughly regulated to suit any kind of limestone.

For roasting quartz similar results would be obtained.

For calcining and roasting cinnabar and other ores, the valuable parts of which escape in combustion or process of calcination, the flues C C allow all the gases to be conducted into condensing-chambers and there saved.

The draft may be assisted by an exhaust-blower, or other device, if desired. Generally, however, if flues after leaving the furnace are large enough and long enough, and properly constructed, no artificial draft or blower is required.

Having thus described our invention, what we claim as new, and desire to secure by Letters Patent, is—

1. The ore-chamber constructed with the inward curves opposite the fire-places, and with the gradual enlargement toward the bottom of the furnace, as shown and described.

2. The ore-chamber constructed with the inward curves, and with the gradual enlargement below the same, as set forth, and having at its top the gas-chamber G, provided with appropriate exit-flues, substantially as shown and described.

3. The ore-chamber constructed with the inward curves opposite the fire-places, with the gradual enlargement toward the bottom of the furnace, and with the series of outlets or pigeon-holes P, communicating with the fire-places, and having severally the downward bevel at their exit-mouths, substantially as and for the purposes set forth.

4. The ore-chamber constructed with the inner curves and with the gradual enlargements above and below the pigeon-holes, the lower enlargement communicating with a series of inclined outlets, both at front and back, substantially as and for the purposes described and shown.

EDMUND GREEN.
ABRAHAM HALSEY.

Witnesses:
CHS. W. WHITE,
P. H. KRANER.